Dec. 8, 1931.  C. J. DOLDING  1,835,639
BALLOON TIRE
Filed Jan. 14, 1927
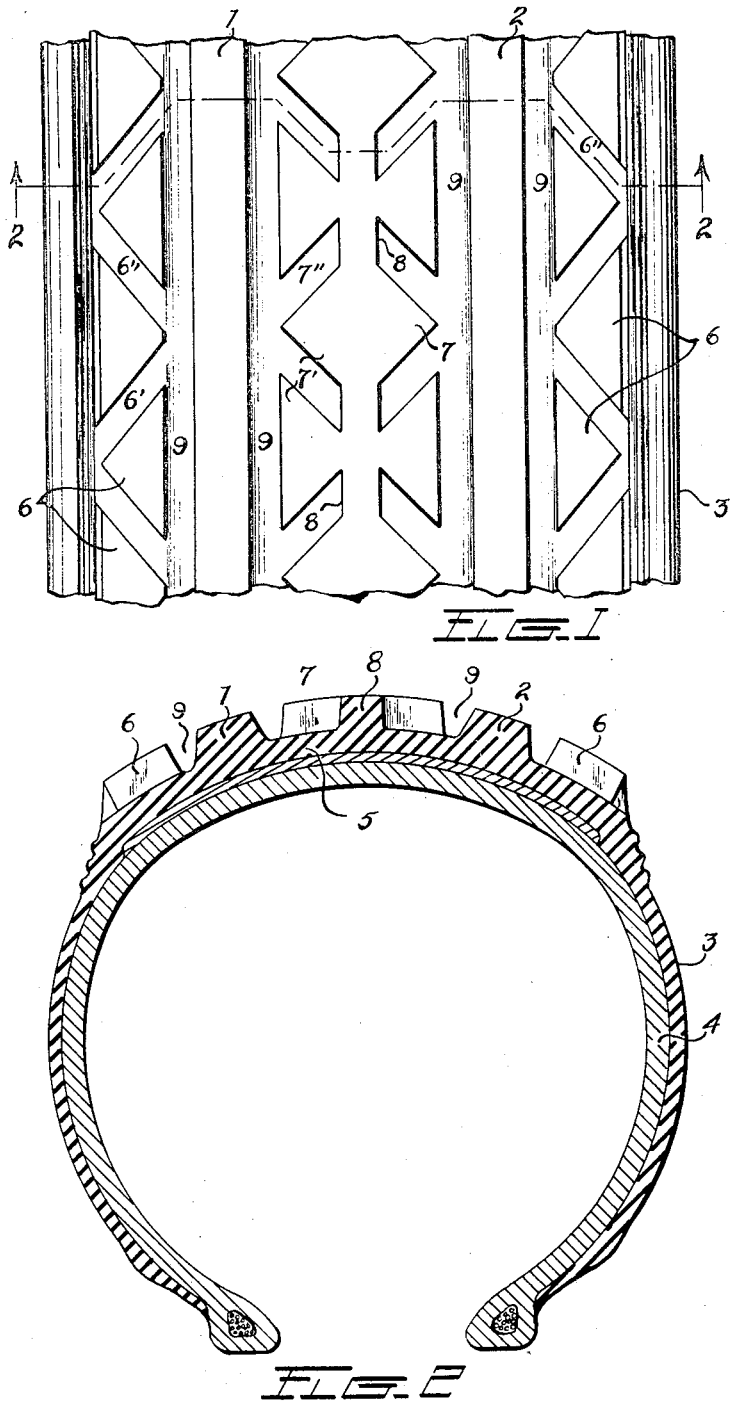
INVENTOR
Chester J. Dolding
BY
HIS ATTORNEY Patented Dec. 8, 1931

1,835,639

UNITED STATES PATENT OFFICE

CHESTER J. DOLDING, OF DETROIT, MICHIGAN, ASSIGNOR TO MORGAN & WRIGHT, OF DETROIT, MICHIGAN, A CORPORATION OF MICHIGAN

BALLOON TIRE

Application filed January 14, 1927. Serial No. 161,067.

It has been discovered that tread designs of tire casings of the old high pressure type are not suitable for tire casings of the low pressure or "balloon" type. When the tread designs for high pressure casings were applied to low pressure casings generally, an unevenness of wear occurred which detracted substantially from their serviceability.

It has been discovered that a more uniform tread wear of low pressure or ballon casings may be obtained by locating continuous ribs on opposite sides of a circumferential center line of the tread and without sacrifice of the necessary traction and anti-skid characteristics which are retained by the provision of flanking traction and anti-skid elements.

An embodiment of the invention is illustrated in the accompanying drawings, in which:—

Fig. 1 is a plan view of a fragment of a balloon tire casing showing an embodiment of the invention; and Fig. 2 is a cross-section of the same.

Referring to the drawings, continuous ribs are shown at 1 and 2 on opposite sides of a plane passing through the center of the tread portion of the casing 3 whose carcass 4 may be of any suitable construction and is surmounted by a rubber composition tread 5 with which the ribs 1 and 2 are preferably made integral during vulcanization of the assembled constituents of the casing in the final cure mold.

While the ribs 1 and 2 afford some protection against sidewise or lateral skidding, further protection against skidding as well as provision for traction is afforded by upstanding projections 6 and 7 presenting walls or faces 6' and 7', respectively, at an angle to the direction of travel.

In the drawings, these walls or faces 6' and 7' are shown inclined to the direction of travel but instead of arranging them at acute or obtuse angles, as shown, they may of course be arranged at right angles to the circumference of the tire, depending of course upon the degrees of traction and anti-skidding qualities it is desired to obtain in the finished casing. The upstanding projections may be of any suitable contour in plan view and may be either wholly unconnected as shown outside of the continuous ribs 1 and 2 or they may be connected by narrow necks of rubber, such as indicated at 8 in the drawings, between the continuous ribs 1 and 2. In other words, the nature of the traction and anti-skid elements 6 and 7 between and outside of the continuous ribs 1 and 2 may be varied without departing from the broad aspects of the invention, which comprehends the use of continuous ribs 1 and 2 with any form of traction and anti-skid element.

While the distance between the continuous ribs 1 and 2 may be varied it is preferred to locate them equi-distant from the central plane of the casing and at a distance apart approximately ten twenty-fourths of the total tread width. Another way of defining the preferred location of the continuous ribs 1 and 2 is by reference to the angle formed by intersecting straight lines both passing through the middle of a line connecting the bottom part (rim seating portion) of each of the beads and respectively passing through the middle of the tread faces of the two ribs. In ballon tire casings from 4.40 to 7.30" in size, such an angle preferably ranges between 21½° and 24°. The cross sections of the continuous ribs 1 and 2 also may be altered, but it is preferred to have their width approximate ten eighty-sixths of the total tread width. The height of the continuous ribs 1 and 2 and of the upstanding projections 6 and 7, constituting the traction and supplemental anti-skid elements, may be anything desired, the depth of the indentures 6" and 7" between the same and of the indentures 9 between the projections 6 and 7, on the one hand, and the continuous ribs 1 and 2, on the other hand, being preferably the same, but may be varied transversely of the casing if desired. In some cases it is common practice to have the indentures decrease in depth towards the side walls of the casing so that the tread design tends to fade into the side wall or at least diminish in prominence. The above figures of location and proportions of the elements of the tread of this invention are given for the sake of definiteness, but the invention is not confined thereto in its broadest aspects as obviously there may be variation of the same in like or in different sizes of casings, without departure from its underlying principle.

The low pressure or balloon type casing of this invention, with two continuous ribs such as 1 and 2 on opposite sides of the central plane of the casing and separated from the other constituent elements of the tread so as to allow the latter to function independently of the former, not only affords greater wear than tread configurations heretofore employed on such casings but preserves the riding, traction and anti-skid qualities throughout the life of the tread configuration with substantial uniformity.

The rubber composition tread 5 is preferably of the relatively flat contour illustrated, in which the lateral and circumferential shifting movements of the constituent elements of the tread configuration are minimized and for the best results this relatively flat type of tread is recommended.

Having thus described my invention what I claim and desire to protect by Letters Patent is:—

1. A balloon casing having an integral vulcanized rubber composition tread comprising circumferentially extending continuous parallel ribs spaced equi-distant from opposite sides of the central plane of the casing, and rows of discontinuous traction and anti-skid projections outwardly flanking and functionally distinct from said ribs.

2. A balloon casing having an integral vulcanized rubber composition tread comprising circumferentially extending continuous parallel ribs spaced equi-distant from opposite sides of the central plane of the casing, and rows of discontinuous traction and anti-skid projections outwardly flanking and functionally distinct from said ribs, said ribs being spaced apart approximately ten twenty-fourths of the total tread width.

3. A balloon casing having an integral vulcanized rubber composition tread comprising centrally located traction and anti-skid projections, circumferentially continuous parallel ribs on opposite sides thereof and separated functionally therefrom, and additional traction and anti-skid projections located on the outside of each of said circumferential ribs and functionally unconnected therewith.

4. A balloon casing having an integral vulcanized rubber composition tread comprising centrally located traction and anti-skid projections, circumferentially continuous ribs on opposite sides thereof and functionally separated therefrom, and additional traction and anti-skid projections located on the outside of each of said circumferential ribs and functionally discontinuous with each other.

5. A balloon tire comprising a semi-flat tread portion, two spaced circumferential ribs formed adjacent the shoulder portions of the tread, a plurality of rows of non-skid elements between the ribs, each element being spaced therefrom and a plurality of rows of non-skid elements adjacent the sides of the tire being spaced from the ribs, all of the ribs and elements being of substantially the same height in relief, and functioning independently.

6. A balloon tire casing comprising a semi-flat road engaging surface having an annular rib disposed adjacent each shoulder portion, and traction elements disposed between and outside of said ribs.

7. A pneumatic balloon tire including a tread formed at least substantially as thick adjacent the outer edges of its road-engaging portion as in its central portion, said road-engaging portion comprising tractive elements and members of greater load-sustaining capacity than the tractive elements disposed in the zones of shoulders of the tire.

8. A balloon tire casing having an integral vulcanized rubber composition and semi-flat tread comprising centrally located traction and anti-skid projections, circumferentially continuous parallel ribs on opposite sides thereof and separated functionally therefrom, said ribs being located adjacent the shoulder portions of the tread, and additional traction and anti-skid projections located on the outside of each of said circumferential ribs and functionally unconnected therewith.

9. A balloon tire casing having an integral vulcanized rubber composition tread formed at least substantially as thick adjacent the outer edges of its road engaging portion as in its central portion comprising centrally located traction and anti-skid projections, circumferentially continuous ribs on opposite sides thereof and functionally separated therefrom, said ribs being located adjacent the shoulder portions of the tread, and additional traction and anti-skid projections located on the outside of each of said circumferential ribs and functionally discontinuous with each other.

Signed at Detroit, county of Wayne, State of Michigan, this 31st day of December, 1926.

CHESTER J. DOLDING.